(No Model.) 2 Sheets—Sheet 1.
A. L. WHITE & D. M. MILLER.
AUTOMATIC PUMPING APPARATUS.
No. 452,628. Patented May 19, 1891.
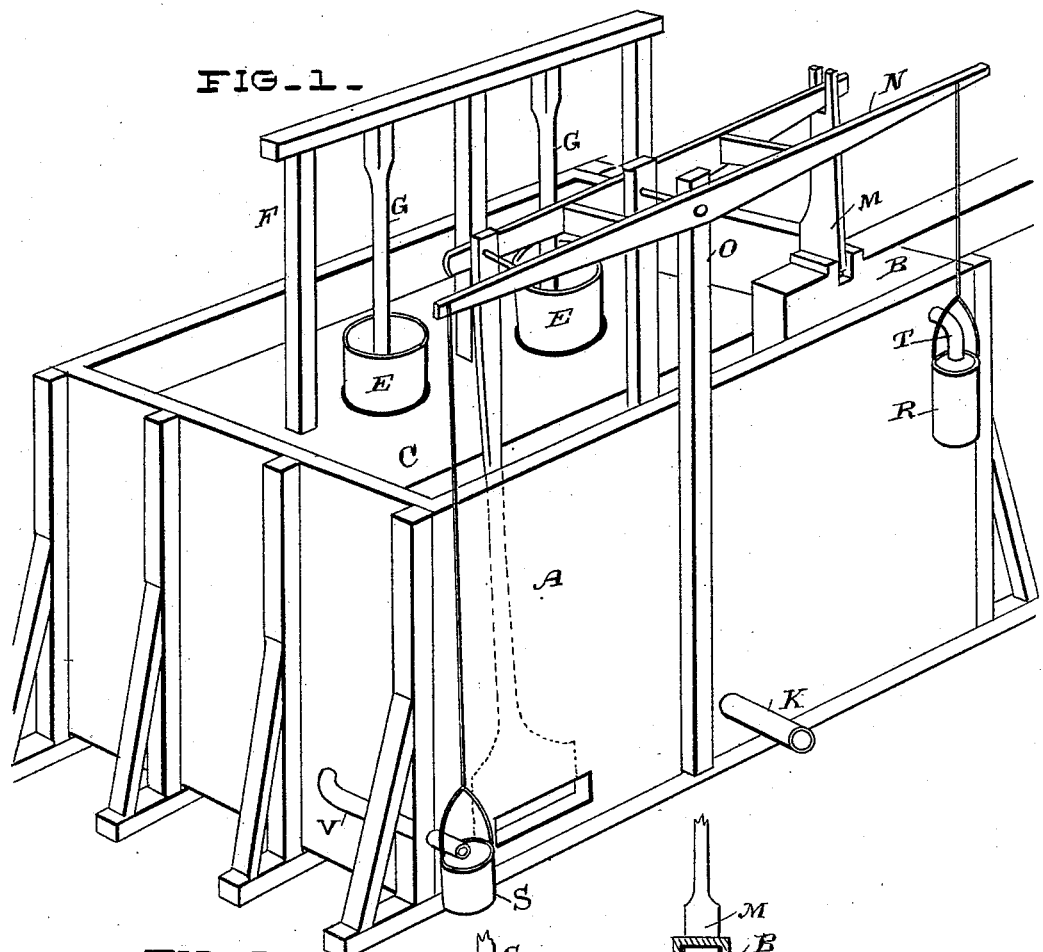
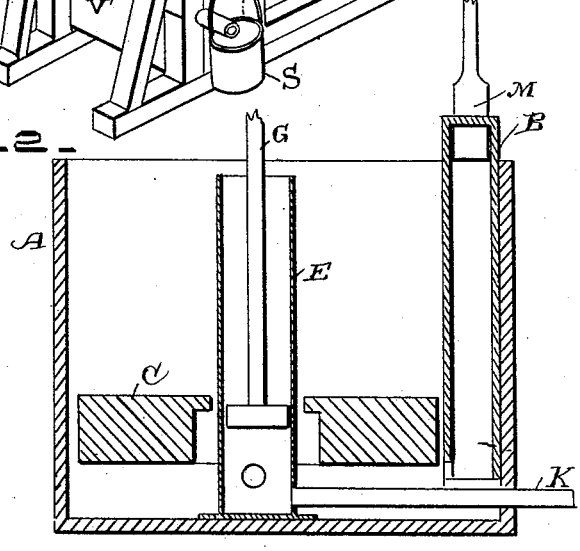
Witnesses:
Inventors,
Alfred L. White
David M. Miller
By Dewey & Co.
atty (No Model.) 2 Sheets—Sheet 2.

A. L. WHITE & D. M. MILLER.
AUTOMATIC PUMPING APPARATUS.

No. 452,628. Patented May 19, 1891.

Witnesses:

Inventors,
Alfred L. White
David M. Miller
By Dewey & Co.
Attys

UNITED STATES PATENT OFFICE.

ALFRED L. WHITE AND DAVID M. MILLER, OF SUISUN, CALIFORNIA.

AUTOMATIC PUMPING APPARATUS.

SPECIFICATION forming part of Letters Patent No. 452,628, dated May 19, 1891.

Application filed December 15, 1890. Serial No. 374,806. (No model.)

*To all whom it may concern:*

Be it known that we, ALFRED L. WHITE and DAVID M. MILLER, citizens of the United States, residing at Suisun, Solano county, State of California, have invented an Improvement in Automatic Pumping Apparatus; and we hereby declare the following to be a full, clear, and exact description of the same.

Our invention relates to a device for raising water, which we call an "automatic pumping apparatus."

It consists of a float or floats arranged to rise and fall within a tank, pumps connected with said floats, so as to be operated by the rise and fall, and a mechanism whereby the water is automatically delivered into and discharged from the tank, so as to alternately raise and depress the float, and in certain details of construction, which will be more fully described in the following specification.

Figure 3:
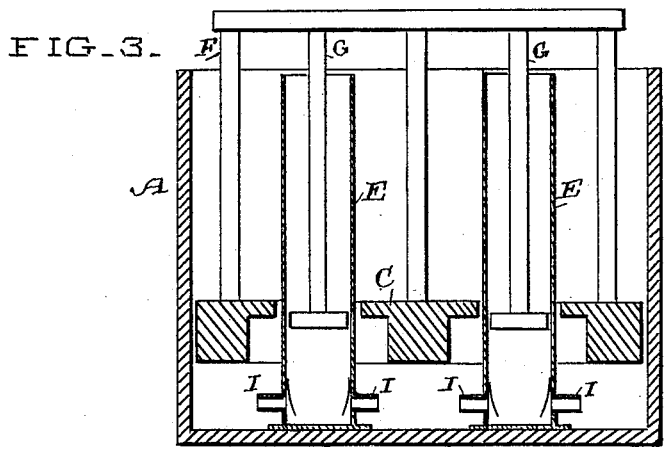
Figure 4:
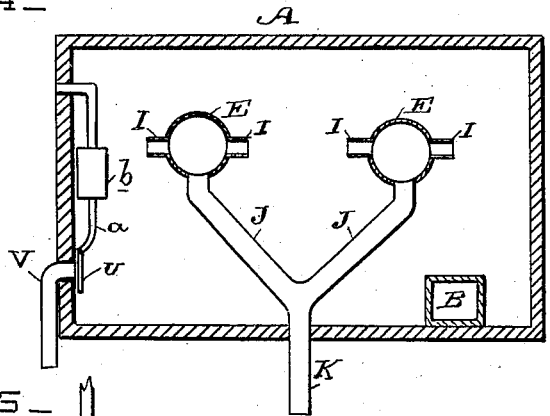
Figure 5:
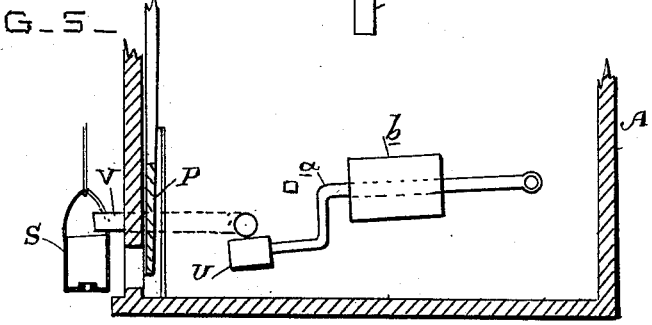

Referring to the accompanying drawings for a more complete explanation of our invention, Figure 1 is an exterior view of our apparatus. Fig. 2 is a transverse sectional view. Fig. 3 is a longitudinal sectional view. Fig. 4 is a horizontal section. Fig. 5 is a detail.

A is a tank, having vertical sides and made of any suitable or desirable size, depending on the size and number of the pumps to be operated and the height to which the water is to be raised by the pumps. This tank is built at some point where a supply of water can be delivered into the upper part of it through a pipe or sluice B, which brings the water from the source of supply. The tank may be ten feet or more in depth, and within it is a float C, this float being large enough to nearly fill the tank and sufficiently buoyant to be raised when the water rises within the tank, at the same time having weight enough to cause it to sink to the bottom whenever the water is discharged from the tank.

E E are pumping-cylinders fixed in the bottom of the tank and projecting vertically upward through openings made for that purpose in the float. As many of these cylinders may be employed as is found necessary or desirable, and they may be made of any suitable size within the capacity of the float to operate the pistons within them. Upon the float is erected a frame or structure F sufficiently stiff and properly braced to retain its position. From the top or cross beam of this frame-work piston-rods G extend downward into the pump-cylinders and are connected with plungers which are properly fitted within the cylinders, so that when they are drawn up to the top they will draw water into the cylinders through supply-pipes I. These pipes may open directly into the bottom of the tank, or may lead to some other source of supply, and are provided with inwardly-opening valves, so that as the float rises and draws the pistons up within the cylinders water will flow in through the inlet-valves and fill the cylinders.

When the float is depressed by the escape of water from the tank, the pistons will force the water outward, the valves in the inlet-pipes will close, and outwardly-opening valves in the discharge-pipes J will be opened, so as to allow the water to flow into a delivery-main K, through which it may be delivered to any suitable reservoir.

In order to operate supply and discharge valves various forms of mechanism may be employed. In the present case we have shown a gate M, which controls the supply of water through the inlet sluice or pipe, and this gate is connected with one arm of an oscillating lever N, fulcrumed at the top of a post O or in any other convenient manner. From the opposite end of the lever a rod connects with the valve or gate P, which opens a discharge at the bottom of the tank, and it will be manifest that by the oscillations of the lever one of the valves or gates will be opened when the other is closed. In order to operate this lever and its connected valves we have shown two buckets R and S, one of which is suspended from each end of the lever operating the gates.

The bucket R receives a supply of water when the tank has become full, the water flowing out of the tank through a pipe T, which delivers it directly into the bucket until the bucket is filled. The weight of the bucket with its contents will then be sufficient to pull down that end of the lever, thus closing the supply valve or gate, and at the same time the opposite end of the lever being raised will open the discharge valve or gate, so as to allow the water to discharge from the tank.

The bucket R has a hole in the bottom, and the size of this hole is so calculated that it is of sufficiently less area than that of the supply-pipe T, so that the bucket will be filled from the supply-pipe and depress the lever; but after this operation has taken place the water will gradually discharge from the bucket, which will be emptied as soon as or before the tank is emptied.

The lever, gates, and buckets are so counterbalanced that they will remain in any position to which they are moved independent of the weight which has moved them to that position, so that whenever the water is discharged from the bucket the latter is simply lightened, so that the next operation can take place; but the lever and the gates will not be moved until some power is applied for that purpose. This power is applied when the tank is nearly empty by means of a valve U, which opens into a pipe V, the latter being so arranged as to discharge into the second bucket S. The valve U is fixed to a lever which is operated by contact of the descending float. This may be made in various ways. In the present case we have shown the lever-arm a, to one end of which the valve is attached, and this lever-arm has a float b upon it sufficiently buoyant to raise the lever-arm until it encounters a stop. This always takes place when the tank is being filled with water, and the lever-arm rising will move the valve U up so as to close the pipe V, which delivers water into the bucket S, and this pipe will remain closed while the tank is filling.

When the tank is being emptied, as before described, by the opening of the main discharge-gate, the float within the tank will sink, and when it comes in contact with the valve-carrying lever or its float the weight will be sufficient to depress that lever until the valve U is opened and water is permitted to flow through the pipe V into the bucket S. By the time this occurs the opposite bucket R will have become empty of its water through the small hole in the bottom, and when the bucket S is filled with water it will in turn descend, thus closing the discharge-gate P from the main tank and opening the gate M in the supply pipe or sluice. The tank then commences refilling through the sluice, and as the main float C rises the small float b upon the lever carrying the valve U is released from pressure and again rises, so as to close the pipe V, which supplies the bucket S. The bucket S has a hole in its bottom so proportioned to the supply-pipe V that the latter will be enabled to fill the bucket by reason of the greater amount of water which it conveys; but when the bucket has been filled and the supply cut off the hole in the bottom will soon discharge the bucket S, and it will then be in position for the reversal of the movement of the lever and of the connected valves or gates. By this construction the operation will be rendered automatic, and it will be manifest that if the apparatus is placed at a point where there is a sufficient fall from the discharge, the discharge from this tank may be delivered directly into another one having a similar pumping apparatus connected with it, and the pipes from the second series of pumps may deliver into the same main as those from the first, so that while one set of pumps is drawing in a supply of water the second set will discharge, thus making the operation continuous.

It will be manifest that various modifications in the arrangement and operation of these valves or gates may be made; but we have found that which we have here described to be very simple and effective.

This apparatus is used to raise water from any stream or source where it is obtainable in sufficient quantity to some elevated point where it is needed, and we have applied it especially to raise water to reservoirs, from which it is afterward used for hydraulic or other forms of mining.

Having thus described our invention, what we claim as new, and desire to secure by Letters Patent, is—

1. The apparatus consisting of the tank, a float loosely fitted within said tank and adapted to rise and fall with the rise and fall of water within the tank, pumps connected with and operated by the rise and fall of the float, a supply and discharge pipe with gates controlling them, and a mechanism comprising a rocking lever and means for operating the same, said lever having its opposite ends connected with the stems of the supply and discharge gate, whereby the supply-gate is opened when a discharge-gate is closed or the discharge-gate is opened and the supply-gate closed to cause the vertical reciprocation of the float within the tank, substantially as herein described.

2. A tank having a float loosely fitted therein, pumps having their pistons connected with said float, so as to rise and fall with the movement of the float, a supply pipe or sluice delivering water into the top of the tank, and a discharge pipe or sluice delivering water from the bottom thereof, gates controlling the supply and discharge pipe and connected with a vertically-oscillating lever fulcrumed between them, buckets suspended from the ends of said lever, having small openings in the bottom thereof through which they may be slowly discharged, and pipes of larger area than the openings leading from the tank, one of said pipes delivering water into one of the buckets when the tank is filled, so as to depress that end of the lever and close the supply and open the discharge gate, and the other pipe delivering water into the opposite bucket when the tank has become emptied, so as to reverse the movement of the lever, open the supply and close the discharge gate, substantially as herein described.

3. The tank with the rising and falling float and the pumps operated thereby, a supply pipe or sluice delivering into the top of the tank and a discharge-sluice delivering from the bottom, gates or valves connected with these sluices and with opposite ends of a lever fulcrumed above the tank, as shown, so that one gate is opened when the other is closed, buckets suspended from opposite ends of said lever, small discharge-holes in their bottoms and pipes of larger area, one arranged to deliver water from the tank when it is full into one of the buckets, whereby the latter is filled, the lever is depressed, and the supply-gate is closed and the discharge-gate opened, and the other bucket receiving water from a second pipe having a valve or gate which is opened by the descending float when it reaches the bottom of the tank, so as to fill said bucket and by its weight reverse the motion of the lever and the position of the supply and discharge gates, so that the tank may again be filled, substantially as herein described.

In witness whereof we have hereunto set our hands.

ALFRED L. WHITE.
DAVID M. MILLER.

Witnesses:
S. H. NOURSE,
H. F. ASCHECK.